United States Patent
Namba

(10) Patent No.: US 11,608,434 B2
(45) Date of Patent: Mar. 21, 2023

(54) RESIN COMPOSITION FOR GOLF BALL, AND GOLF BALL

(71) Applicant: Bridgestone Sports Co., Ltd., Tokyo (JP)

(72) Inventor: Atsushi Namba, Saitamaken (JP)

(73) Assignee: Bridgestone Snorts Co.. Ltd., Tokyo (JP)

( * ) Notice: Subject to any disclaimer, the term of this patent is extended or adjusted under 35 U.S.C. 154(b) by 0 days.

(21) Appl. No.: 17/341,639

(22) Filed: Jun. 8, 2021

(65) Prior Publication Data
US 2021/0403698 A1    Dec. 30, 2021

(30) Foreign Application Priority Data

Jun. 26, 2020    (JP) .............................. JP2020-110580

(51) Int. Cl.
| | |
|---|---|
| *A63B 37/06* | (2006.01) |
| *C08L 39/00* | (2006.01) |
| *A63B 37/00* | (2006.01) |
| *C08L 33/08* | (2006.01) |

(52) U.S. Cl.
CPC ............ *C08L 39/00* (2013.01); *A63B 37/005* (2013.01); *A63B 37/0024* (2013.01); *A63B 37/0039* (2013.01); *C08L 33/08* (2013.01)

(58) Field of Classification Search
CPC ........................ A63B 37/0023; A63B 37/0039
USPC ........................................................ 473/373
See application file for complete search history.

(56) References Cited

U.S. PATENT DOCUMENTS

| | | |
|---|---|---|
| 4,337,947 A | 7/1982 | Saito et al. |
| 2002/0052254 A1 | 5/2002 | Ichikawa et al. |

FOREIGN PATENT DOCUMENTS

| | | |
|---|---|---|
| JP | 56-083367 A | 7/1981 |
| JP | 60-060867 A | 4/1985 |
| JP | 2001-514561 A | 9/2001 |
| JP | 2002-143345 A | 5/2002 |
| WO | 98/40127 A1 | 9/1998 |

*Primary Examiner* — Raeann Gorden
(74) *Attorney, Agent, or Firm* — Sughrue Mion, PLLC

(57) ABSTRACT

A resin composition for golf balls includes (a) an acid-containing copolymer having an amount of acid constituent per 100 wt % of the sum of monomer units in the copolymer that is from 1 to 30 wt %, and (b) an amine-containing polymer having a branched structure. The resin composition imparts golf balls with an excellent rebound resilience and also confers an outstanding durability to repeated impact and an outstanding scuff resistance, making it particularly useful as a cover material in golf balls.

6 Claims, No Drawings

RESIN COMPOSITION FOR GOLF BALL, AND GOLF BALL

CROSS-REFERENCE TO RELATED APPLICATION

This non-provisional application claims priority under 35 U.S.C. § 119(a) on Patent Application No. 2020-110580 filed in Japan on Jun. 26, 2020, the entire contents of which are hereby incorporated by reference.

TECHNICAL FIELD

The present invention relates to a resin composition for golf balls and to a golf ball in which such a composition is used. More particularly, the invention relates to a resin composition for golf balls having a core encased by a cover of at least two layers—an intermediate layer and an outermost layer—in which the resin composition can be advantageously used as the intermediate layer material or the outermost cover material, and to a golf ball in which such a resin composition is used.

BACKGROUND ART

In a golf ball having a core and a cover, the cover material—as the term implies—serves to protect the core material. Ethylene/acid copolymers, or ones neutralized with metal ions, are most often used as the cover material. The reason is that these ethylene/acid copolymers and metal salts thereof are tough and have an excellent rebound resilience. The physical properties of ethylene/acid copolymers and metal salts thereof are determined by such factors as the acid content, the type of metal ion that neutralizes the acid and the degree of neutralization. Generally, when the acid content increases, the ethylene/acid copolymer or metal salt thereof becomes hard and has a high rigidity. On the other hand, when the degree of neutralization increases, the ethylene/acid copolymer or metal salt thereof has a higher rebound resilience. This effect is especially pronounced in resins having a backbone composed of three constituents: ethylene, an acid and an ester.

However, there are certain drawbacks to the use of a copolymer or metal ion-neutralized material made up of three constituents—ethylene, an acid and an ester—as the cover material in a golf ball; namely, the durability to repeated impact and the scuff resistance of the golf ball worsen.

Numerous methods to modify the properties of ethylene/acid copolymers and metal salts thereof have been attempted, many of which involve blending a rubber, elastomer or hard polymer in the ethylene/acid copolymer or metal salt thereof. However, the properties such as distance, spin rate on approach shots and durability that are desired in a golf ball do not all improve as a result.

JP-A S60-60867 and JP-A 2001-514561 describe various art that blends in a hard polymer such as a polyamide or a crystalline polymer so as to impart rigidity to an ethylene/acid copolymer or a metal salt thereof. Also, JP-A 2002-143345 and JP-A S56-083367 describe a variety of art that blends in an elastomer such as a polyester elastomer, styrene elastomer, polyamide elastomer or polyurethane elastomer for the purpose of imparting toughness to an ethylene/acid copolymer or metal salt thereof or merely for modification to a soft tactile feel.

However, golf balls in which the foregoing prior-art materials are used as the cover material often give rise to a decline in the rebound resilience, and so there remains room for improvement.

SUMMARY OF THE INVENTION

It is therefore one object of the present invention to provide a resin composition for golf balls that imparts golf balls with an excellent rebound resilience and also confers an outstanding durability to repeated impact and an outstanding scuff resistance. Another object of the invention is to provide a golf ball in which such a resin composition is used.

As a result of extensive investigations, I have discovered that when a resin composition which includes both an acid-containing copolymer wherein the amount of acid constituent falls in a specific range and an amine-containing polymer having a branched structure such as polyethyleneimine is employed in a golf ball member, the rebound resilience of the golf ball can be improved and the ball can also be imparted with an excellent durability to cracking and an excellent scuff resistance.

That is, when an ethylene/acid-containing copolymer or a metal salt thereof and a polymer having a branched structure and a high amine value such as polyethyleneimine are blended together, because some of the acid constituent in the acid-containing copolymer covalently bonds with the amine in the amine-containing polymer, the ethylene/acid copolymer or metal salt thereof and the amine-containing polymer have a good compatibility and mix together well. When external forces act on a resin material made up of this two-component mixture, the loss in dynamic viscoelasticity that arises at interfaces between the two polymers is low. It is presumably for this reason that golf balls which use this resin material have an excellent rebound resilience and also have an excellent durability to repeated impact and scuff resistance.

Accordingly, in a first aspect, the invention provides a resin composition for golf balls which includes (a) an acid-containing copolymer having an amount of acid constituent per 100 wt % of the sum of monomer units in the copolymer that is from 1 to 30 wt %, and (b) an amine-containing polymer having a branched structure.

In a preferred embodiment of the resin composition of the invention, the amine-containing polymer having a branched structure (b) is polyethyleneimine.

In another preferred embodiment, the acid-containing copolymer (a) is an olefin-α,β-unsaturated carboxylic acid copolymer or an olefin-α,β-unsaturated carboxylic acid-α, β-unsaturated carboxylic acid ester copolymer.

In yet another preferred embodiment, the resin composition further includes (c) metal ions which neutralize from 0.1 to 99 mol % of the acid constituent in the acid-containing copolymer (a).

In still another embodiment, the resin composition further includes (d) a fatty acid or a metal salt thereof.

In a second aspect, the invention provides a golf ball having a core of at least one layer and a cover of at least one layer, wherein at least one layer of the cover is formed of the resin composition according to the first aspect of the invention.

In a preferred embodiment of the golf ball according to the second aspect of the invention, the cover consists of two layers: an outermost layer and an intermediate layer positioned between the outermost layer and the core, which intermediate layer is formed of the resin composition according to the first aspect of the invention.

Advantageous Effects of the Invention

The resin composition for golf balls of the invention imparts golf balls with an excellent rebound resilience and also confers an outstanding durability to repeated impact and an outstanding scuff resistance, making it particularly useful as a cover material (i.e., an outermost layer-forming material or intermediate layer-forming material) in golf balls.

DESCRIPTION OF THE PREFERRED EMBODIMENTS

The objects, features and advantages of the invention will become more apparent from the following detailed description.

The resin composition for golf balls of the invention includes as the chief ingredient (a) an acid-containing copolymer having an amount of acid constituent per 100 wt % of the sum of monomer units in the copolymer that is from 1 to 30 wt %. Details on this component (a) are provided below.

In the acid-containing copolymer (a), the acid is selected from carboxylic acids (including carboxylic anhydrides and derivatives thereof), dicarboxylic acids (which includes, here and below, half-ester carboxylic acids), sulfonic acids and phosphoric acids. Carboxylic acids are especially preferred. Specific examples of such acid-containing copolymers include olefin-α,β-unsaturated carboxylic acid copolymers and olefin-α,β-unsaturated carboxylic acid-α,β-unsaturated carboxylic acid ester copolymers.

The olefin in the above copolymer generally has at least two carbon atoms, with the upper limit being preferably up to eight carbon atoms, and especially up to six carbon atoms. Specific examples include ethylene, propylene, butene, pentene, hexene, heptene and octene. Ethylene is especially preferred. Examples of the unsaturated carboxylic acid in component (a) include acrylic acid, methacrylic acid, maleic acid and fumaric acid, with acrylic acid and methacrylic acid being especially preferred. The unsaturated carboxylic acid ester in the copolymer is preferably a lower alkyl ester of the above unsaturated carboxylic acid, specific examples of which include methyl methacrylate, ethyl methacrylate, propyl methacrylate, butyl methacrylate, methyl acrylate, ethyl acrylate, propyl acrylate and butyl acrylate. Butyl acrylate (n-butyl acrylate, i-butyl acrylate) is especially preferred.

The acid-containing copolymer (a) may be one that is neutralized with metal ions. Specific examples include ones that can be obtained by partially neutralizing acid groups on the above olefin-unsaturated carboxylic acid (or olefin-unsaturated carboxylic acid-unsaturated carboxylic acid ester) copolymer with metal ions. The metal ions that neutralize the acid groups are exemplified by $Na^+$, $K^+$, $Li^+$, $Zn^{++}$, $Cu^{++}$, $Mg^{++}$, $Ca^{++}$, $Co^{++}$, $Ni^{++}$ and $Pb^{++}$, with the use of $Na^+$, $Li^+$, $Zn^{++}$, $Mg^{++}$ and $Ca^{++}$ being especially preferred. These neutralization products can be obtained by a known method. For example, the neutralization product may be obtained by using compounds such as formates, acetates, nitrates, carbonates, bicarbonates, oxides, hydroxides or alkoxides of these metal ions in the above copolymer A known product may be used as component (a). Examples of commercially available products that may be used as the acid-containing copolymer include Nucrel® 1560, Nucrel® N1214, Nucrel® N1035, Nucrel® N2060, Nucrel® AN4221C, Nucrel® AN4311 and Nucrel® AN4319 (all products of Dow-Mitsui Polychemicals Co., Ltd.). Examples of commercially available products that may be used as the metal ion neutralization product of the acid copolymer include Himilan® 1554, Himilan® 1557, Himilan® 1601, Himilan® 1605, Himilan® 1706, Himilan® AM7311, Himilan® 1855, Himilan® 1856, Himilan® AM7316 (all products of Dow-Mitsui Polychemicals Co., Ltd.), and Surlyn® 7930, Surlyn® 6320, Surlyn® 8660, Surlyn® 8320, Surlyn® 9320 and Surlyn® 8120 (all products of The Dow Chemical Company).

The content of unsaturated carboxylic acid (acid content) included in the copolymer serving as component (a) is preferably at least 1 wt %, more preferably at least 4 wt %, and even more preferably at least 8 wt %, per 100 wt % of the sum of monomer units in the copolymer. The upper limit is preferably not more than 30 wt %, more preferably not more than 25 wt %, and even more preferably not more than 22 wt %. At an unsaturated carboxylic acid content (acid content) within this range, the compatibility with component (b) is good.

Next, component (b) is an amine-containing polymer which has a branched structure. Component (b) is not a completely linear polymer; rather, it is a polymer that has a branched structure and includes on the molecule a primary, secondary or tertiary amine. For this reason, component (b) has a high cation density and good reactivity, and so it reacts with the unneutralized acid constituent in component (a). The microstructure of an ethylene and acid-containing copolymer or a metal salt thereof is generally determined by the acid content, the type of metal ions that neutralize the acid and the degree of neutralization. By blending it with an amine-containing polymer having a branched structure, such as polyethyleneimine, a resin composition can be obtained that has distinctive mechanical properties which are difficult to achieve in acid-containing copolymers alone or in the blends of acid-containing copolymers with polyamides and the blends of acid-containing copolymers with polyethylene that have hitherto been described in the art.

Component (b) is an amine-type polymer such as polyethyleneimine. The polyethyleneimine is preferably one having a high amine value, with the amine value being preferably from 18 to 21. The amine value is expressed as the number of millimoles of amine included per gram of polyethyleneimine solids.

The content of component (b) per 100 parts by weight of component (a) is preferably at least 0.01 part by weight, and more preferably at least 0.1 part by weight. The upper limit is preferably not more than 10 parts by weight, and more preferably not more than 8 parts by weight. When the component (b) content is too small, the desired effects cannot be obtained. On the other hand, when it is too large, the compatibility with component (a) may worsen and the desired effects may not be obtained, or resin scorching will occur during processing and processing will not be possible.

In addition, (c) metal ions may be included in this invention. That is, component (c), which furnishes metal ions for neutralizing unneutralized acid groups in the acid-containing copolymer serving as component (a), is preferably a basic inorganic metal compound. Examples of the metal ions in component (c) include $Li^+$, $Na^+$, $K^+$, $Ca^{++}$, $Mg^{++}$, $Zn^{++}$, $Al^{+++}$, $Ni^{++}$, $Fe^{++}$, $Fe^{+++}$, $Cu^{++}$, $Mn^{++}$, $Sn^{++}$, $Pb^{++}$ and $Co^{++}$. These may be used singly or two or more may be used in combination. Known basic inorganic fillers containing these metal ions may be used as component (c). Specific examples include magnesium oxide, magnesium hydroxide, magnesium carbonate, zinc oxide, sodium hydroxide, sodium carbonate, calcium oxide, calcium hydroxide, lithium hydroxide and lithium carbonate. A hydroxide or a monoxide is especially recommended. Preferred use can be made of calcium hydroxide and magnesium oxide which have high reactivities with the base resin.

The content of component (c) is generally at least 0.1 part by weight, and preferably at least 0.5 part by weight, per 100 parts by weight of component (a). The upper limit is generally not more than 15 parts by weight, and preferably not more than 10 parts by weight.

The degree of neutralization of component (a), based on the total amount of acid groups in component (a), is from 0 to 99 mol %, and preferably from 0.1 to 90 mol %. At a component (a) degree of neutralization that is less than 50 mol %, in addition to the ball rebound (initial velocity), the scuff resistance further improves. At a component (a) degree of neutralization that is 50 mol % or more, the durability to cracking can be further enhanced. The component (a) degree of neutralization is preferably at least 60 mol %, more preferably at least 70 mol %, and even more preferably at least 80 mol %.

The resin composition of this invention may additionally include, as component (d), a fatty acid or a metal salt thereof. This component (d) has a very small molecular weight compared with the resin components and is preferably included because it is an ingredient that suitably adjusts the melt viscosity of the mixture, contributing in particular to enhanced flowability.

The fatty acid of component (d) has a molecular weight that may be set to generally at least 280, preferably at least 300, more preferably at least 330, and even more preferably at least 360. The upper limit in the molecular weight is generally not more than 1,500, preferably not more than 1,000, more preferably not more than 600, and even more preferably not more than 500. When the molecular weight is too small, the heat resistance may be poor; when the molecular weight is too large, it may be impossible to improve the flowability.

Specific examples of component (d) include magnesium stearate, calcium stearate, zinc stearate, magnesium 12-hydroxystearate, calcium 12-hydroxystearate, zinc 12-hydroxystearate, magnesium arachidate, calcium arachidate, zinc arachidate, magnesium behenate, calcium behenate, zinc behenate, magnesium lignocerate, calcium lignocerate and zinc lignocerate. Of these, preferred use can be made of magnesium stearate, calcium stearate, zinc stearate, magnesium arachidate, calcium arachidate, zinc arachidate, magnesium behenate, calcium behenate, zinc behenate, magnesium lignocerate, calcium lignocerate and zinc lignocerate. These may be used singly or as combinations of two or more thereof.

The content of component (d) per 100 parts by weight of component (a) is generally at least 5 parts by weight, preferably at least 10 parts by weight, and more preferably at least 15 parts by weight. The upper limit in the content is generally not more than 120 parts by weight, and preferably not more than 80 parts by weight.

Various additives may be optionally included in the resin composition of the invention. For example, pigments, dispersants, antioxidants, light stabilizers, ultraviolet absorbers and internal mold release agents may be suitably included.

The resin composition of the invention can be obtained by mixing together the above ingredients using any of various types of mixers, such as a kneading-type single-screw or twin-screw extruder, a Banbury mixer or a kneader.

The resin composition for golf balls of the invention can be used as the cover material (intermediate layer and outermost layer), particularly in two-piece solid golf balls composed of a core and a cover encasing the core, or in multi-piece solid golf balls having a core of at least one layer and a multilayer cover encasing the core.

The constituent members of the golf ball in which the resin composition of the invention is used are described below.

The core can be formed using a known rubber material as the base. A known rubber such as natural rubber or a synthetic rubber may be used as the base rubber. More specifically, the use of primarily polybutadiene, especially cis-1,4-polybutadiene having a cis structure content of at least 40%, is recommended. Where desired, natural rubber, polyisoprene rubber, styrene-butadiene rubber or the like may be used together with the foregoing polybutadiene in the base rubber.

The polybutadiene used may be one synthesized with a rare-earth catalyst such as a neodymium catalyst or with a metal catalyst such as a cobalt catalyst or nickel catalyst.

Co-crosslinking agents such as unsaturated carboxylic acids and metal salts thereof, inorganic fillers such as zinc oxide, barium sulfate and calcium carbonate, and organic peroxides such as dicumyl peroxide and 1,1-bis(t-butylperoxy)cyclohexane may be included in the base rubber. Where necessary, commercial antioxidants and the like may also be suitably added.

The core diameter is suitably selected according to the ball structure. Although not particularly limited, the core diameter is preferably at least 20 mm, more preferably at least 25 mm, and even more preferably at least 30 mm. The upper limit is preferably not more than 41 mm, and more preferably not more than 40 mm.

An intermediate layer may be provided between the core and the cover outermost layer. In this case, the intermediate layer has a material hardness on the Shore D hardness scale which, although not particularly limited, may be set to typically at least 50, preferably at least 55, and more preferably at least 60. The material hardness is preferably not more than 70, and more preferably not more than 65.

The intermediate layer of the cover has a thickness which, although not particularly limited, is preferably at least 0.3 mm, more preferably at least 0.4 mm, and even more preferably at least 0.5 mm. The thickness is preferably not more than 1.2 mm, more preferably not more than 1.0 mm, and even more preferably not more than 0.8 mm.

Numerous dimples of one or more type may be formed on the surface of the cover. Also, various types of coatings may be applied to the cover surface. Because the coating must be capable of enduring the harsh conditions of golf ball use, a two-part curable urethane coating, especially a non-yellowing urethane coating, is preferred.

EXAMPLES

The following Examples and Comparative Examples are provided to illustrate the invention, and are not intended to limit the scope thereof.

Examples 1 to 16, Comparative Examples 1 to 4

Solid cores having a diameter of 37.3 mm were produced by using the rubber composition C1 shown in Table 1 and vulcanizing at 155° C. for 15 minutes.

TABLE 1

| Core composition (amounts in pbw) | C1 | C2 |
|---|---|---|
| Cis-1,4-Polybutadiene | 100 | 100 |
| Zinc stearate | — | 3 |
| Zinc acrylate | 22 | 26 |
| Zinc oxide | ≥5 (suitable amount) | ≥5 (suitable amount) |
| Antioxidant | 0.1 | 0.1 |
| Organic peroxide (1) | 0.6 | 0.6 |
| Organic peroxide (2) | 0.6 | 1.2 |
| Zinc salt of pentachlorothiophenol | 0.6 | 0.8 |
| Water | — | 0.05 |

Details on the above core materials are given below.
cis-1,4-Polybutadiene: Available under the trade name "BR01" from JSR Corporation.
Zinc stearate: Available from NOF Corporation
Zinc acrylate: Available from Nippon Shokubai Co., Ltd.
Zinc oxide: Available from Sakai Chemical Co., Ltd.
Antioxidant: Available under the trade name "Nocrac NS6" from Ouchi Shinko Chemical Industry Co., Ltd.
Organic peroxide (1): Dicumyl peroxide, available as "Percumyl® D" from NOF Corporation
Organic peroxide (2): A mixture of 1,1-di(t-butylperoxy) cyclohexane and silica, available as "Perhexa® C-40" from NOF Corporation Formation of Cover Layer (Intermediate Layer and Outermost Layer)

Next, the resin compositions shown in Tables 2 and 3 below were injection-molded over the 37.3 mm diameter core obtained above, thereby producing a sphere encased by an intermediate layer having a thickness of 1.45 mm (intermediate layer-encased sphere). The resin compositions shown in Tables 2 and 3 below were then injection-molded over the intermediate layer-encased sphere, thereby producing a sphere encased by an outermost layer having a thickness of 1.25 mm (three-piece golf ball). Dimples common to all of the Examples were formed at this time on the surface of the cover in each Example and Comparative Example.

TABLE 2

| | Resin composition (amounts in pbw) | COM | | | | | | | | | | | | | | | |
|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 |
| (a) | Nucrel® 2060 | 100 | 100 | 100 | 100 | 100 | 100 | 100 | 100 | 100 | | | | | | | |
| | Nucrel® 4319 | | | | | | | | | | | | | | | | |
| | Surlyn® 8660 | | | | | | | | | | 100 | 100 | 100 | 100 | 100 | 100 | 100 |
| — | Polyamide | | | | | | | | | | | | | | | | |
| | Polyester | | | | | | | | | | | | | | | | |
| (b) | Polyethyl-eneimine (A) | — | 0.25 | 1 | 4 | | | | | | — | 0.25 | 1 | 2 | | | |
| | Polyethyl-eneimine (B) | | | | | 0.25 | 1 | 4 | | | | | | | 0.25 | 1 | 2 |
| | Polyethyl-eneimine (C) | | | | | | | | 1 | 3 | | | | | | | |
| (c) | Metal ions | — | — | — | — | | | | | | — | — | — | — | | | |
| (d) | Magnesium stearate | | | | | | | | | | | | | | | | |
| | White colorant | | | | | | | | | | | suitable amount | | | | | |
| | Acid content of acid copolymer (wt %) | 20 | 20 | 20 | 20 | 20 | 20 | 20 | 20 | 20 | 11 | 11 | 11 | 11 | 11 | 11 | 11 |
| | Percent neutralization of acid in acid copolymer by metal ions | 0 | 0 | 0 | 0 | 0 | 0 | 0 | 0 | 0 | 35 | 35 | 35 | 35 | 35 | 35 | 35 |

TABLE 3

| | Resin composition (amounts in pbw) | COM | | | | | | | | | | | | | | |
|---|---|---|---|---|---|---|---|---|---|---|---|---|---|---|---|---|
| | | 17 | 18 | 19 | 20 | 21 | 22 | 23 | 24 | 25 | 26 | 27 | 28 | 29 | 30 | 31 |
| (a) | Nucrel® 2060 | | | | | | | | | | | | | | | |
| | Nucrel® 4319 | | | | | 100 | 100 | 100 | 100 | 100 | 100 | 100 | 100 | 100 | 100 | 15 |
| | Surlyn® 8660 | 100 | 100 | 50 | 50 | | | | | | | | | | | 85 |
| — | Polyamide | | | 50 | | | | | | | | | | | | |
| | Polyester | | | | 50 | | | | | | | | | | | |

TABLE 3-continued

| Resin composition (amounts in pbw) | | 17 | 18 | 19 | 20 | 21 | COM 22 | 23 | 24 | 25 | 26 | 27 | 28 | 29 | 30 | 31 |
|---|---|---|---|---|---|---|---|---|---|---|---|---|---|---|---|---|
| (b) | Polyethyl-eneimine (A) | | | | | — | 0.25 | 1 | 2 | | | | | | | |
| | Polyethyl-eneimine (B) | | | | | | | | | 0.25 | 1 | 2 | | | | |
| | Polyethyl-eneimine (C) | 1 | 3 | | | | | | | | | | 1 | 3 | | |
| (c) | Metal ions | | | | | 0.68 | 0.68 | 0.68 | 0.68 | 0.68 | 0.68 | 0.68 | 0.68 | 0.68 | 1.28 | |
| (d) | Magnesium stearate | | | | | 60 | 60 | 60 | 60 | 60 | 60 | 60 | 60 | 60 | 60 | |
| White colorant | | suitable amount | | | | | | | | | | | | | | suitable amount |
| Acid content of acid copolymer (wt %) | | 11 | 11 | 11 | 11 | 8 | 8 | 8 | 8 | 8 | 8 | 8 | 8 | 8 | 8 | |
| Percent neutralization of acid in acid copolymer by metal ions | | 35 | 35 | 35 | 35 | 80 | 80 | 80 | 80 | 80 | 80 | 80 | 80 | 80 | 90 | |

Details on the ingredients in the above table are given below.

Nucrel® 2060, Nucrel® 4319:
  Sodium ion-neutralized ionomers available from Dow-Mitsui Polychemicals Co., Ltd.
Surlyn® 8660: An ionomer resin available from The Dow Chemical Company
Polyamide: Available as "Vestamid E58-S4" from Daicel-Evonik, Ltd.
Polyester: Available as "Hytrel® 5557G10" from DuPont-Toray Co., Ltd.
Polyethyleneimine (A): "Epomin™ SP-003" from Nippon Shokubai Co., Ltd. (number-average molecular weight, approx. 300; amine value, 21)
Polyethyleneimine (B): "Epomin™ SP-012" from Nippon Shokubai Co., Ltd. (number-average molecular weight, approx. 1,200; amine value, 19)
Polyethyleneimine (C): 1:1 blend of "Epomin™ SP-200" from Nippon Shokubai Co., Ltd. (number-average molecular weight, approx. 10,000; amine value, 18) and "Epomin P-1000" from Nippon Shokubai Co., Ltd. (number-average molecular weight, 70,000; amine value, 18); average of number-average molecular weights, approx. 18,000
Metal ions: From magnesium oxide available as "Kyowamag MF-150" from Kyowa Chemical Industry Co., Ltd.
Magnesium stearate: Available under the trade name "Magnesium Stearate G" from NOF Corporation.

The ball initial velocity on driver shots and the scuff resistance for the golf balls obtained in each Example and Comparative Example were evaluated by the following methods. The results are presented in Tables 4 and 5.

Ball Initial Velocity

A driver (W #1) was mounted on a golf swing robot, and the initial velocity of the ball immediately after being struck at a head speed of 45 m/s was measured with an apparatus for measuring the initial conditions. The club used was the TourB XD-3 Driver (loft angle, 9.5°) manufactured by Bridgestone Sports Co., Ltd.

Scuff Resistance

The golf balls were held isothermally at 23° C. and five balls of each type were hit at a head speed of 33 m/s using as the club a pitching wedge mounted on a swing robot machine. The damage to the ball from the impact was visually rated according to the following criteria.

Very good (VG): Substantially no visible damage.
Good: Dimple edge portions are scraped. Scrapings appear as approx. 2 to 3 mm long, less than 1 mm thick threads remaining attached to damaged area. Linear scratches less than 1 mm wide are present at dimple lands.
Poor: Dimple edge portions or dimple land portions are deformed, but not scraped or cut away. The dimple shapes are not retained.
Very poor (VP): Dimples are scraped away from edge portions to land portions. Scrapings remain attached to damaged area. The dimple shapes are not retained.

TABLE 4

| | | Comp. Example | Example | | | | | | | |
|---|---|---|---|---|---|---|---|---|---|---|
| | | 1 | 1 | 2 | 3 | 4 | 5 | 6 | 7 | 8 |
| Core | Material | C1 | C1 | C1 | C1 | C1 | C1 | C1 | C1 | C1 |
| | Diameter, mm | 37.3 | 37.3 | 37.3 | 37.3 | 37.3 | 37.3 | 37.3 | 37.3 | 37.3 |
| Intermediate layer | Material | COM 1 | COM 2 | COM 3 | COM 4 | COM 5 | COM 6 | COM 7 | COM 8 | COM 9 |
| | Thickness, mm | 1.45 | 1.45 | 1.45 | 1.45 | 1.45 | 1.45 | 1.45 | 1.45 | 1.45 |
| Diameter of intermediate layer-encased sphere, mm | | 40.2 | 40.2 | 40.2 | 40.2 | 40.2 | 40.2 | 40.2 | 40.2 | 40.2 |

TABLE 4-continued

|  |  | Comp. Example | Example | | | | | | | |
|---|---|---|---|---|---|---|---|---|---|---|
|  |  | 1 | 1 | 2 | 3 | 4 | 5 | 6 | 7 | 8 |
| Cover | Material | COM 10 | COM 10 | COM 10 | COM 10 | COM 10 | COM 10 | COM 10 | COM 10 | COM 10 |
|  | Thickness, mm | 1.25 | 1.25 | 1.25 | 1.25 | 1.25 | 1.25 | 1.25 | 1.25 | 1.25 |
| Diameter of cover-encased sphere (ball), mm |  | 42.7 | 42.7 | 42.7 | 42.7 | 42.7 | 42.7 | 42.7 | 42.7 | 42.7 |
| Ball initial velocity on driver shots, m/s |  | 66.1 | 66.4 | 66.3 | 66.3 | 66.4 | 66.3 | 66.3 | 66.2 | 66.2 |

It is apparent from the results in Table 4 that in Examples 1 to 8, wherein component (b) is included in the intermediate layer-forming resin composition, the ball initial velocity is higher than in Comparative Example 1.

TABLE 5

|  |  | Comp. Ex. | Example | | | | | | | | Comparative Example | |
|---|---|---|---|---|---|---|---|---|---|---|---|---|
|  |  | 2 | 9 | 10 | 11 | 12 | 13 | 14 | 15 | 16 | 3 | 4 |
| Core | Material | C1 | C1 | C1 | C1 | C1 | C1 | C1 | C1 | C1 | C1 | C1 |
|  | Diameter, mm | 37.3 | 37.3 | 37.3 | 37.3 | 37.3 | 37.3 | 37.3 | 37.3 | 37.3 | 37.3 | 37.3 |
| Intermediate layer | Material | COM 30 | COM 30 | COM 30 | COM 30 | COM 30 | COM 30 | COM 30 | COM 30 | COM 30 | COM 30 | COM 30 |
|  | Thickness, mm | 1.45 | 1.45 | 1.45 | 1.45 | 1.45 | 1.45 | 1.45 | 1.45 | 1.45 | 1.45 | 1.45 |
| Diameter of intermediate layer-encased sphere, mm |  | 40.2 | 40.2 | 40.2 | 40.2 | 40.2 | 40.2 | 40.2 | 40.2 | 40.2 | 40.2 | 40.2 |
| Cover | Material | COM 10 | COM 11 | COM 12 | COM 13 | COM 14 | COM 15 | COM 16 | COM 17 | COM 18 | COM 19 | COM 20 |
|  | Thickness, mm | 1.25 | 1.25 | 1.25 | 1.25 | 1.25 | 1.25 | 1.25 | 1.25 | 1.25 | 1.25 | 1.25 |
| Diameter of cover-encased sphere (ball), mm |  | 42.7 | 42.7 | 42.7 | 42.7 | 42.7 | 42.7 | 42.7 | 42.7 | 42.7 | 42.7 | 42.7 |
| Ball initial velocity on driver shots, m/s |  | 66.0 | 66.2 | 66.2 | 66.2 | 66.2 | 66.2 | 66.2 | 66.2 | 66.2 | 65.4 | 65.3 |
| Scuff resistance |  | good | VG | VG | VG | VG | VG | VG | VG | VG | poor | poor |

From the results in Table 5, it is apparent that in Examples 9 to 16, wherein component (b) is included in the intermediate layer-forming resin composition, the ball initial velocity is higher and the scuff resistance is better than in Comparative Example 2. In Comparative Examples 3 and 4, wherein the resin composition is a blend of polyester elastomer and polyamide, the ball evaluations show that the ball initial velocity is low and the scuff resistance is poor.

Examples 17 to 24, Comparative Example 5

Solid cores having a diameter of 37.3 mm are produced by using the rubber composition C2 shown in Table 1 and vulcanizing at 155° C. for 15 minutes. Next, the resin compositions shown in Tables 2 and 3 above are injection-molded over the 37.3 mm diameter core obtained above, thereby producing a sphere encased by an intermediate layer having a thickness of 1.45 mm (intermediate layer-encased sphere). The resin compositions shown in Tables 2 and 3 are then injection-molded over the intermediate layer-encased sphere, thereby producing a sphere encased by an outermost layer having a thickness of 1.25 mm (three-piece golf ball). Dimples common to all of the Examples are formed at this time on the surface of the cover in each Example and Comparative Example.

For the golf balls obtained in each Example and Comparative Example, the initial velocity of the ball on driver shots is measured by the method described above and the durability to repeated impact is evaluated by the following method. The results are presented in Table 6.

Durability to Repeated Impact

The durability of the golf ball is evaluated using an ADC Ball COR Durability Tester produced by Automated Design Corporation (U.S.). This tester fires a golf ball pneumatically and causes it to repeatedly strike two metal plates arranged in parallel. The incident velocity against the metal plates is set to 43 m/s. The number of shots required for the golf ball to crack is measured and the durability is rated according to the following criteria based on this number of shots.

Very good (VG): Number of shots is from 125 to 150

Good: Number of shots is from 100 to 124

Poor: Number of shots is from 75 to 99

Very poor (VP): Number of shots is from 50 to 74

TABLE 6

|  |  | Comp. Example | Example | | | | | | | |
| --- | --- | --- | --- | --- | --- | --- | --- | --- | --- | --- |
|  |  | 5 | 17 | 18 | 19 | 20 | 21 | 22 | 23 | 24 |
| Core | Material | C2 | C2 | C2 | C2 | C2 | C2 | C2 | C2 | C2 |
|  | Diameter, mm | 37.3 | 37.3 | 37.3 | 37.3 | 37.3 | 37.3 | 37.3 | 37.3 | 37.3 |
| Intermediate layer | Material | COM 21 | COM 22 | COM 23 | COM 24 | COM 25 | COM 26 | COM 27 | COM 28 | COM 29 |
|  | Thickness, mm | 1.45 | 1.45 | 1.45 | 1.45 | 1.45 | 1.45 | 1.45 | 1.45 | 1.45 |
| Diameter of intermediate layer-encased sphere, mm |  | 40.2 | 40.2 | 40.2 | 40.2 | 40.2 | 40.2 | 40.2 | 40.2 | 40.2 |
| Cover | Material | COM 31 | COM 31 | COM 31 | COM 31 | COM 31 | COM 31 | COM 31 | COM 31 | COM 31 |
|  | Thickness, mm | 1.25 | 1.25 | 1.25 | 1.25 | 1.25 | 1.25 | 1.25 | 1.25 | 1.25 |
| Diameter of cover-encased sphere (ball), mm |  | 42.7 | 42.7 | 42.7 | 42.7 | 42.7 | 42.7 | 42.7 | 42.7 | 42.7 |
| Ball initial velocity on driver shots, m/s |  | 66.0 | 66.3 | 66.3 | 66.2 | 66.3 | 66.3 | 66.2 | 66.3 | 66.2 |
| Durability on repeated impact |  | good | VG | VG | VG | VG | VG | VG | VG | VG |

It is apparent from the results in Table 6 that in Examples 17 to 24, wherein component (b) is included in the intermediate layer-forming resin composition, the ball initial velocity is higher and the durability to cracking is better than in Comparative Example 5.

Japanese Patent Application No. 2020-110580 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A golf ball comprising a core of at least one layer and a cover of at least one layer, wherein at least one layer of the cover is formed of the resin composition comprising:
   (a) an acid-containing copolymer having an amount of acid constituent per 100 wt % of the sum of monomer units in the copolymer that is from 1 to 30 wt %, and
   (b) an amine-containing polymer having a branched structure.

2. The golf ball of claim 1, wherein the cover consists of two layers: an outermost layer and an intermediate layer positioned between the outermost layer and the core, which intermediate layer is formed of the resin composition.

3. The golf ball of claim 1, wherein the amine-containing polymer having a branched structure (b) is polyethyleneimine.

4. The golf ball of claim 1, wherein the acid-containing copolymer (a) is an olefin-α,(β-unsaturated carboxylic acid copolymer or an olefin-α,(β-unsaturated carboxylic acid-α,(β-unsaturated carboxylic acid ester copolymer.

5. The golf ball of claim 1, further comprising (c) metal ions which neutralize from 0.1 to 99 mol % of the acid constituent in the acid-containing copolymer (a).

6. The golf ball of claim 1, further comprising (d) a fatty acid or a metal salt thereof.

* * * * *